United States Patent [19]

Niwano et al.

[11] Patent Number: 4,845,142

[45] Date of Patent: Jul. 4, 1989

[54] MAGNETO OPTICAL DISK SUBSTRATE COMPRISING AN AROMATIC VINYL MONOMER AND A POLYPHENYLENE ETHER

[75] Inventors: Masahiro Niwano; Kenji Manabe, both of Niihama, Japan

[73] Assignee: Sumitomo Chemical Company, Limited, Osaka, Japan

[21] Appl. No.: 205,953

[22] Filed: Jun. 13, 1988

[30] Foreign Application Priority Data

Jun. 16, 1987 [JP] Japan ................................ 62-150697
Apr. 26, 1988 [JP] Japan ................................ 63-103224

[51] Int. Cl.$^4$ .............................................. C08L 25/02
[52] U.S. Cl. .................................... 524/287; 524/291; 524/292; 524/295; 524/296; 524/298; 524/299
[58] Field of Search ................ 525/508; 526/290; 524/295, 291, 292, 300, 321, 322, 299, 287, 296, 298

[56] References Cited

U.S. PATENT DOCUMENTS 4,373,065  2/1983  Prest, Jr. ............................ 525/132
4,460,743  7/1984  Abe et al. ............................ 525/68

FOREIGN PATENT DOCUMENTS 63-13722  1/1988  Japan .

Primary Examiner—Joseph L. Schofer
Assistant Examiner—Jeffrey T. Smith
Attorney, Agent, or Firm—Stevens, Davis, Miller & Mosher

[57] ABSTRACT

Optical devices such as optical disk substrates and lenses are prepared by molding a resin composition comprising 100 parts by weight of a mixture of 30 to 70% by weight of a polymer in which 50% by weight or more is composed of aromatic vinyl monomer units and 70 to 30% by weight of a polyphenylene ether, and 0.005 to 2 parts by weight of an organic carboxylic acid.

1 Claim, No Drawings

MAGNETO OPTICAL DISK SUBSTRATE COMPRISING AN AROMATIC VINYL MONOMER AND A POLYPHENYLENE ETHER

BACKGROUND OF THE INVENTION

1. FIELD OF THE INVENTION

The present invention relates to small birefringent optical devices which are useful, for example, as optical disk substrates for recording and reproducing information optically, lenses, prisms, etc.

2. DESCRIPTION OF THE PRIOR ARTS

Recently there is noticed the system of recording and reproducing high-density information, e.g. images and/or sounds, by using laser beams, wherein the information is recorded in the form of fine projections or depressions on disk substrates or in the form of changes in an optical property of recording films formed on disk substrates.

Disk substrates for use in the above recording and reproducing system are required to be transparent and in addition have such properties as good dimensional stability, high optical homogeneity, and small birefringence.

Plenty of duplicated substrates can be economically produced by using a resin material as a material of the disk substrate. However, it is widely recognized that the resin flows during the molding of the disk substrate and molecules are oriented during cooling so the birefringence is induced. This is a fatal defect for optical disk substrates.

The molecular orientation caused during molding is inevitable particularly in injection molding. From these point of view, a polymer comprising methyl methacrylate is the only resin material with small optical anisotropy for molding of disk substrates.

Known polymer comprising methyl methacrylate, however, have a drawback in that because of their high hydroscopicity, substrates formed thereof are inferior in dimensional stability, that is, the substrate warps and/or twists in highly humid atmosphere.

This drawback is as described in detail, for example, in Nikkei Elecctronics (p. 133, issued June 7, 1982). Therefore, aromatic polycarbonate resins having low hygroscopicity are in use as materials for acoustic compact disks.

On the other hand, it is difficult to decrease the birefringence of the molded substrates formed of aromatic carbonate resins since they contain aromatic rings, which have large anisotropy, in the backbone chain. Decreasing of the molecular weight and conditions of the molding are under investigation. However, since birefringence of the substrate originates from the material itself, it is impossible to constantly produce substrate with small birefringence and it is extremely difficult at present to produce small birefringent substrates larger in diameter than acoustic compact disks by injection molding.

To improve dimensional stability which is a drawback of the polymer comprising methyl methacrylate, copolymers comprising methyl methacrylate and aromatic vinyl monomer are proposed [e.g. Japanese Patent Application (Laid-Open) Nos. 33446/82, 162135/82, and 88843/83]. However, these copolymers having aromatic rings cannot be practically used on account of their liability to large birefringence. For the disk substrates which is used not only for reproducing but also recording of information, a material is required to have smaller birefringence and dimensional stability, but no resin has yet been found that can adequately satisfy these requirements.

With respect to other optical devices including lenses and prisms, for which methacrylic resins and the like have been used as materials, there are needs for optical devices formed from a resin which has smaller birefringence and is superior in heat resistance, mechanical strength, and dimensional stability.

U.S. Pat. No. 4,373,065 discloses an optical recording device comprising an optically isotropic composition prepared by mixing two resins which have opposite optical anisotropies but are completely miscible with each other, in such a ratio that their optical anisotropies will be just compensated with each other to reduce the birefringence to substantially zero.

This patent further describes mixtures prepared by using a polyphenylene ether and polystyrene as component polymers having opposite optical anisotropies and showed that in a film prepared from such a composition of the mixture, that these anisotropies are just compensated with each other, and does not cause birefringence even when stress is exerted on the film in the solid state.

However, this patent does not reveal that an optical device such as an optical disk substrate, when formed from the above polymer composition by injection molding, exhibits small birefringence.

The present inventors have found that the birefringence of moldings such as optical disk substrates is not always small when these moldings are formed by injection molding, which is recently the most common method of forming optical devices, even from a mixture of two polymers which have opposite optical anisotropies in the solid state but are completely miscible with each other, wherein the mixing ratio is such that the optical anisotropies in the solid state are just compensated with each other.

That is, it has been found that optical materials such as an optical disk substrate having small birefringence can not be obtained by injection molding of any composition of polymer mixtures that is chosen by considering merely the optical anisotropy of each polymer in the solid state.

In recent years, attempts are in progress to produce plastic substrates of magneto optical disks where the erasing and rewritting of information are possible.

Information recorded on such an optical disk of a magneto optical type is read by focussing a polarlized laser beam through a lens on the recording medium of the disk and detecting a Kerr effect-induced slight rotation of the polarization plane of the laser beam reflected from the recording media. Accordingly, it is necessary in this case to use an optical disk substrate which scarcely causes the birefringence for oblique incident beams as well.

In addition, the optical disk substrate is required to have high heat resistance since the substrate during information writting is heated by a laser beam.

Furthermore, from the viewpoint of environmental stability, the adherence of a recording medium and an optical disk substrate should be excellent for a long period of time.

SUMMARY OF THE INVENTION

In view of such circumstances as stated above, the present inventors made intensive studies, and as a result have been successful in providing an optical device which has small birefringence for vertical incident beams as well as oblique ones even when formed by injection molding, compression molding, or the like, and has high heat resistance, well-balanced mechanical strengths, and superior dimensional stability, and has excellent adhesion to the recording medium for a long period of time.

According to the present invention, there is provided an optical device comprising polymer portions constituted mostly of aromatic vinyl monomer units and polyphenylene ether portions, and an organic carboxylic acid.

DETAILED DESCRIPTION OF THE INVENTION

The present invention relates to optical devices comprising 100 parts by weight of a mixture of 30 to 70% by weight of a polymer in which 50% by weight or more is composed of aromatic vinyl monomer units, 70 to 30% by weight of a polyphenylene ether, and 0.005 to 2 parts by weight of an organic carboxylic acid.

The polymer in which 50% by weight or more is composed of aromatic vinyl monomer units, referred to in the invention, is an aromatic vinyl homopolymer or a copolymer comprising aromatic vinyl monomer units in an amount of at least 50% by weight. Examples of the aromatic vinyl monomer include styrene, α-methylstyrene, m-methylstyrene, p-methylstyrene, o-chlorostyrene, m-chlorostyrene, p-chlorostyrene, m-bromostyrene, and p-bromostyrene. In particualr, styrene is favorably used.

Suitable monomers herein for copolymerization with such an aromatic vinyl monomer include; unsaturated nitriles, e.g. acrylonitrile and methacrylonitrile; alkyl methacrylates, e.g. methyl methacrylate, n-propyl methacrylate, isopropyl methacrylate, n-butyl methacrylate, and cyclohexyl methacrylate; alkyl acrylates, e.g. methyl acrylate, ethyl acrylate, propyl acrylate, and butyl acrylate, and further, methacrylic acid, acrylic acid, maleic anhydride, citraconic anhydride, N-methylmaleimide, and N-phenylmaleimide.

These comonomers may be used alone or in combination, wherein the kinds and proportions of monomers used may be suitably chosen within the range thereof where none of them impair the transparency of the resulting polymer composition that comprises an aromatic vinyl copolymer and a polyphenylene ether.

The proportion of the aromatic vinyl monomer in the monomer mixture to form the copolymer is desired to be at least 50% by weight, otherwise the resulting resin will have undesirably high hygroscopicity.

The melt fluidity of the polymer constituted mainly of aromatic vinyl monomer units, expressed in melt flow rate (MFR) at 230° C. under 3.8 kg load, is desirably from 0.5 to 200, preferably from 2 to 100. When the MFR exceeds 200, the polymer is poor in mechanical strength and when the MFR is less than 0.5, the birefringence is difficult to decrease.

The polymer constituted mostly of aromatic vinyl monomer units may be produced by any of bulk, suspension, emulsion, and solution polymerization methods using a radical initiator, but bulk polymerization and suspension polymerization are preferable in view of the productivity and less impurity-contamination of the polymer.

Suitable radical initiators for the polymerization include peroxides, e.g. lauroyl peroxide, benzoyl peroxide, di-tert-butyl peroxide, and dicumyl peroxide, and azo compounds, e.g. 2,2'-azobisisobutyronitrile and 1,1'-azobis(1-cyclohexanecarbonitrile).

If necessary for controlling the molecular weight, such a chain transfer agent is added as tert-butyl, n-butyl, n-octyl, n-dodecyl, or tert-dodecyl mercaptan.

The polymerization is generally carried out at a temperature of 50° to 150° C.

The polyphenylene ether referred to in the present invention is a polymer consisting of recurring units represented by the formula

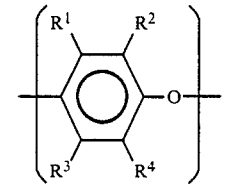

wherein each of $R^1$, $R^2$, $R^3$ and $R^4$ denotes hydrogen, halogen, or hydrocarbon groups.

Polyphenylene ethers, defined above, are readily prepared by known methods (see, e.g. Japanese Patent Publication Nos. 18692/61 and 36518/72), that is, by oxidative coupling of phenolic monomers in the presence of a copper or manganese catalyst.

Examples of the polyphenylene ethers include poly(2,6-dimethyl-1,4-phenylene) ether, poly(2-methyl-6-ethyl-1,4-phenylene) ether, poly(2-methyl-6-propyl-1,4-phenylene)ether, poly(2,6-dipropyl-1,4-phenylene)ether, and poly(2-methyl-6-bromo-1,4-phenylene)ether. In particular, poly(2,6-dimethyl-1,4-phenylene)ether is preferable.

In the present invention, polyphenylene ether resins generally in use as engineering plastics are acceptable but those of lower molecular weights are preferred.

That is, when the average molecular weight of polyphenylene ether is expressed in terms of the intrinsic viscosity of the polymer in chloroform at 25° C., acceptable values thereof are 0.1 to 1.0, but desirable are 0.3 to 0.7, preferable 0.3 to 0.4.

When the value is less than 0.1, the resulting optical device will have poor mechanical strength and will not have small birefringence. When the value is more than 1.0, but only the homogeneity but also the melt flow rate of the molding composition are lowered.

The organic carboxylic acid for the present invention includes aliphatic carboxylic acids, alicylic carboxylic acids, and aromatic carboxylic acids. The aliphatic carboxylic acids include aliphatic monocarboxylic acids such as butyric acid, valeric acid, hexanoic acid, stearic acid, and the like; and aliphatic dicarboxylic acids such as malonic acid, succinic acid, methylmalonic acid, ethylmalonic acid, methylsuccinic acid, glutaric acid, adipic acid and the like. The aromatic carboxylic acids include benzoic acid, o-methylbenzoic acid, m-methylbenzoic acid, p-methylbenzoic acid, o-, m- and p-ethylbenzoic acid, o-, m- and p-hydroxybenzoic acid, o-, m- and p-phthalic acid, phenylmalonic acid, trimesic acid, pyromellitic acid, salicyclic acid, 3,4-dimethoxybenzoic acid, 3,5-dimethoxybenzoic acid, m- and p-methoxybenzoic acid, m-, p- and t-butylbenzoic acid, 2-phenoxybenzoic acid, 3,5-di-t-butyl-4-hydroxybenzoic acid, biphenyl2,2'-dicarboxylic acid, 4,4-bis(p-hydroxyphenyl)-valeric acid, mandelic acid, etc. Among them, the aromatic carboxylic acids are preferred.

In the present invention, melt or solution mixing is suitable for prepaing the resin material of optical devices by mixing the aromatic vinyl-based polymer and the polyphenylene ether and the organic carboxylic acid.

The melt mixing is carried out by using a mixing machine such as an extruder, Banbury mixer, kneader blender, or heat roller mill under high shear stress at temperatures of at least the glass transition point of the polyphenylene ether.

The degree of mixing is such that particles sizes of both the mixed and dispersed polymers become desirable about 1 μor less, preferably of molecular order. Whether the molecular-order dispersion is reached can be readily judged by observing the mixture to exhibit a single glass transition temperature.

For achieving a satisfactory state of mixing, means are taken for raising the mixing temperature, extending the mixing period, and further enhancing the shear stress.

In the melt mixing, an organic solvent may be used in a small amount as a plasticizer for lowering the glass transition temperature of both the polymers, thereby facilitating the mixing.

Organic solvents, as cited below, suitable for the solution mixing can also be used in this case. The used solvent may be removed by distillation after completion of the mixing.

The solution mixing can be accomplished by dissolving each polymer in an organic solvent to a concentration of at least 1% by weight, mixing the solutions with stirring to form a uniform mixture, and either distillation of the mixture to remove the solvent or addition of a solvent poor in the ability to dissolve both the polymers to the mixture to precipitate the polymers.

Suitable solvents for the solution mixing include, for example, chloroform, toluene, benzene, and chlorobenzene. Suitable poor solvents include, for example, methanol, ethanol, propanol, n-hexane, and n-pentane, etc.

The proportions of the aromatic vinyl-based polymer and the polyphenylene ether, in the optical device, are 30–70%, preferably 40–55%, by weight and 70–30%, preferably 60–45%, by weight, respectively. When the proportion of the polyphenylene ether is less than 30% by weight or more than 70% by weight, the birefringence of the optical device is not sufficiently small. In addition, when the polyphenylene ether proportion is less than 30% by weight, the optical device is insufficient for heat resistance.

The proportion of the organic carboxylic acid is 0.005 to 2 parts by weight, preferably 0.01 to 1 parts by weight per 100 parts by weight of the resin. When the proportion is less than 0.005 parts by weight, the environmental stability of the optical device of the present invention is not sufficient particularly when the optical device is used as an optical disk substrate. When the proportion exceeds 2 parts by weight, not only the heat resistance but also the transparency are lowered.

The resin composition of the optical device, in practice, is suitably chosen within the above defined range depending on the method of molding. In injection molding, for example, the resin proportions may be suitably chosen depending on preset conditions of molding, such as resin temperature, injection pressure, and mold temperature so that the birefringence of the moldings will agree with the level required to use the product for the intended purposes.

Optical devices, particularly optical disk substrates, of the present invention in certain applications transmit semiconductor laser beams or the like. Accordingly, the light transmittance of optical devices for such applications is desired to be at least 75% at a wavelength of 800 nm when the thickness of optical device is 1.2 mm.

Of the optical devices of the present invention, optical disk substrates can be formed by injection molding, compression molding, and injection-compression molding. The effect of the present invention is the more remarkable when a molding method, among the above, is applied that tends to form the higher birefringent products, though injection molding is best suited in view of productivity.

The optical devices according to the present invention show small birefringence even when they are produced by injection molding, compression molding or the like. Moreover, they show only small birefringence even in the case of an oblique incident beam, and have high heat resistance, well-balanced mechanical strength, and excellent dimensional stability.

Furthermore, when used as a substrate for magneto optical disk, the optical device according to the present invention has excellent adhesive properties to the recording medium and excellent environmental stability. Thus, it can be said that the present invention is very effective for cost reduction and general application as a magneto optical disk.

The following examples illustrate the present invention in more detail without limiting the scope of the invention. In the examples, parts and percentages are all by weight.

Physical properties shown in the examples were measured in the following ways.

Intrinsic viscosity of polymer

Measured in chloroform at 25° C. using Ubbelohde viscometer, followed by calculation.

Water absorption

Equilibrium water absorption in water at 60° C. was measured in accordance with ASTM D-570.

Light transmittance

The transmittance of a 1.2 mm thick specimen was measured at a wavelength of 800 nm using a self recording spectrophotometer (Model 330, mfd, by Hitachi Ltd.)

Flexural properties:

Measured in accordance with ASTM D-790.

Heat resistance

Expressed in terms of glass transition temperature measured by the linear expansion coefficient method by the use of a 5 mm×5 mm×3 mm test piece.

Birefringence

Retardation was measured at 546 nm according to the Cénarmont compensator method by means of a polarization microscope.

Evaluation of performance characteristics of magneto optical disk

Heat history conditions of magneto optical disk:
Humidity : 93±3% constant
Temperature change: 1 cycle 24 hours

| Temperature (°C.) | Time |
| --- | --- |
| 25 | 2.0 |
| 25 → −10 | 0.75 |
| −10 | 2.75 |
| −10 → 25 | 0.5 |
| 25 | 1.0 |
| 25 → 65 | 1.5 |
| 65 | 5.0 |
| 65 → 2.5 | 1.5 |
| 25 | 1.0 |
| 25 → 65 | 1.5 |
| 65 | 5.0 |
| 65 → 25 | 1.5 |

Conditions of recording on magneto optical disk

Rotation rate: 1800 r.p.m.

Recording frequency: 1 MHz (for C/N), 3 MHz (for BER)

Recording power: 6 mW

Recording magnetic field: 350 Oe

Recording time: 10 seconds (for about 300 tracks)

C/N:

Measured at a position of 30 mm distance from the center of the disk by using a magneto optical disk evaluating apparatus OMS-100 mfd. by NAKAMICHI CO.

Bit error rate (BER)

Measurement was conducted at a reproducing output of 1 mW at positions of 40 mm, 45 mm, 50 mm and 55 mm disk radii by using the same apparatus as described above, and the average value was calculated.

State of recording medium

Confirmed by visual observation.

The kneadking and pelletizating was carried out by using a twin-screw extruder (Model TEX30-30BW-2V, supplied by the Japan Steel Works, Ltd.).

The injection molding was carried out by using an injection molding machine (Neomat Model 150/75 (75 ton), supplied by Sumitomo Heavy Industries, Ltd.) and a mold for producing a disk 130 mm across and 1.2 mm thick.

Example 1

In a 2 m$^3$ reactor equipped with a thermometer, reflux condenser, dropping funnel, stirrer, and gas inlet tube was placed a mixed solution of 2.2 kg of ethanolamine and 10 kg of methanol, and stirred. Subsequently, 64 kg of a solution of 30 g of manganese (II) chloride dissolved in methanol and 254 kg of xylene were placed in the reactor, and oxygen gas was passed through the reactor for 15 minutes. Then, a mixed solution of 98 kg of 2,6-xylenol and 120 kg of xylene was charged into the reactor, after which oxygen gas was blown through the resulting mixture with stirring to subject the mixture to reaction at 30° C. for 5 hours. The reaction mixture was poured into a large amount of methanol containing a small amount of hydrochloric acid to precipitate a polymer. The polymer was filtered and the residue was washed with methanol and water and dried to obtain 92 kg of poly(2,6-dimethyl-1,4-phenylene) ether having an intrinsic viscosity of 0.40.

With 50 kg of the polyphenylene ether were mixed 50 kg of polystyrene resin (ESBRIGHT ®4-62A, mfd. by Sumitomo Chemical Co., Ltd.) and 1 kg of m-phthalic acid (mfd. by Wako Pure Chemical Industries Ltd.), followed by kneading and granulation by means of an extruder.

By the use of a part of the pellets thus obtained, the light transmittance, water absorption rate, flexual properties and heat resistance were measured. The results obtained are shown in Table 1.

Further, the pellets were injection-molded at a cylinder temperature of 320° C. and at a mold temperature of 85° C. to obtain a grooved substrate (groove pitch: 1.6μ) having a diameter of 130 mm and a thickness of 1.2 mm.

The birefringence was measured at 35 mm distance from the center of the disk substrate. The result obtained is shown in Table 1.

Reactive sputtering of silicone was conducted on the substrate in an atmosphere of mixed gas of argon and nitrogen under a vacuum of $5 \times 10^{-3}$ Torr to form a silicon nitride film having a refractive index of 2.0 and a thickness of 850 Å.

Further, in accordance with the conventional method, magnetic layer of TbFeCo was sputtered on the silicon nitride film to a thickness of 900 Å, followed by sputtering thereon silicon nitride to a thickness of 850 Å in the same manner as described above, whereby a magneto optical disk having a structure of substrate silicon nitride/TbFeCo/silicon nitride was prepared.

Performance characteristics of the magneto optical disk were evaluated. The results obtained are shown in Table 1.

Example 2

The process of Example 1 was repeated except for changing the amount of m-phthalic acid from 10 g to 1 kg. The results obtained are shown in Table 1.

Example 3

The process of Example 1 was repeated except for using 100 g of p-phthalic acid in place of 1 kg of m-phthalic acid. The results obtained are shown in Table 1.

Example 4

The process of Example 1 was repeated except for using 200 g of trimesic acid in place of 1 kg of m-phthalic acid. The results obtained are shown in Table 1.

Comparative Example 1

The process of Example 1 was repeated without m-phthalic acid. The results are shown in Table 1.

Comparative Example 2

The process of Example 1 was repeated except for changing the amount of m-phthalic acid from 1 kg to 3 kg. Bleeding of a large amount of m-phthalic acid was observed on a substrate obtained by injection molding, and the subsequent evaluation was impossible.

Comparative Example 3

The process of Example 1 was repeated except for changing the amount of m-phthalic acid from 1 kg to 2 g. The results obtained are shown in Table 1.

TABLE 1

| | Properties | | | Example 1 | Example 2 | Example 3 | Example 4 | Comparative Example 1 | Comparative Example 3 |
|---|---|---|---|---|---|---|---|---|---|
| Resin composition | Light transmittance (%) | | | 87 | 87 | 87 | 87 | 88 | 88 |
| | Water absorption (%) | | | 0.11 | 0.11 | 0.10 | 0.10 | 0.10 | 0.10 |
| | Flexural strength (kg/cm$^2$) | | | 980 | 1010 | 1000 | 1020 | 1060 | 1050 |
| | Heat resistance (°C.) | | | 145.1 | 146.0 | 145.8 | 145.5 | 146.8 | 146.5 |
| Substrate | Retardation (nm) | | | −2.0 | −1.5 | −1.5 | −1.0 | +2.0 | −1.5 |
| Magneto optical disk | Heat history | Before | C/N (dB) | 46 | 46 | 46 | 46 | 46 | 46 |
| | | | BER | $7.9 \times 10^{-5}$ | $7.9 \times 10^{-5}$ | $7.8 \times 10^{-5}$ | $7.8 \times 10^{-5}$ | $7.8 \times 10^{-5}$ | $7.9 \times 10^{-5}$ |
| | | | State of recording medium | — | — | — | — | — | — |
| | | After once | C/N (dB) | 46 | 46 | 46 | 46 | 46 | 46 |
| | | | BER | $8.1 \times 10^{-5}$ | $8.2 \times 10^{-5}$ | $8.0 \times 10^{-5}$ | $8.1 \times 10^{-5}$ | $3.1 \times 10^{-4}$ | $3.4 \times 10^{-4}$ |
| | | | State of recording medium | Unchanged | Unchanged | Unchanged | Unchanged | Unchanged | Unchanged |
| | | After 10 times | C/N (dB) | 46 | 46 | 46 | 46 | 45 | 45 |
| | | | BER | $8.2 \times 10^{-5}$ | $8.5 \times 10^{-5}$ | $8.3 \times 10^{-5}$ | $8.5 \times 10^{-5}$ | $9.2 \times 10^{-4}$ | $9.0 \times 10^{-4}$ |
| | | | State of recording medium | Unchanged | Unchanged | Unchanged | Unchanged | Unchanged | Unchanged |
| | | After 30 times | C/N (dB) | 45 | 45 | 45 | 45 | 40 | 41 |
| | | | BER | $8.2 \times 10^{-5}$ | $8.6 \times 10^{-5}$ | $8.5 \times 10^{-5}$ | $8.7 \times 10^{-5}$ | $2.4 \times 10^{-3}$ | $3.5 \times 10^{-3}$ |
| | | | State of recording medium | Unchanged | Unchanged | Unchanged | Unchanged | Bubble-like peeling | Bubble-like peeling |

We claim:

1. A magneto optical disk substrate comprising 100 parts by weight of a mixture of 30 to 70% by weight of a polymer in which 50% by weight or more is composed of aromatic vinyl monomer units and 70 to 30% by weight of a polyphenylene ether, and 0.005 to 2 parts by weight of at least one aromatic carboxylic acid selected from the group consisting of benzoic acid, o-methylbenzoic acid, m-methylbenzoic acid, p-methylbenzoic acid, o-, m- and p-ethylbenzoic acid, o-, m- and p-hydroxybenzoic acid, o-, m- and p-phthalic acid, phenylmalonic acid, trimesic acid, pyromellitic acid, salicyclic acid, 3,4-dimethoxybenzoic acid, 3,5-dimethoxybenzoic acid, m- and p-methoxybenzoic acid, m-, p-and t-butylbenzoic acid, 2-phenoxybenzoic acid, 3,5-di-t-butyl-4-hydroxybenzoic acid, biphenyl-2,2'-dicarboxylic acid, 4,4'-bis(p-hydroxyphenyl)valeric acid, and mandelic acid.

* * * * *